United States Patent [19]
Kakutani

[11] Patent Number: 5,627,659
[45] Date of Patent: May 6, 1997

[54] IMAGE PROCESSING SYSTEM CAPABLE OF SELECTING FROM AMONG A PLURALITY OF ERROR DIFFUSION MATRICES

[75] Inventor: Toshiaki Kakutani, Nagano, Japan

[73] Assignee: Seiko Epson Corporation, Tokyo, Japan

[21] Appl. No.: 388,430

[22] Filed: Feb. 14, 1995

[30] Foreign Application Priority Data

Feb. 14, 1994 [JP] Japan .................................. 6-017569

[51] Int. Cl.$^6$ .................................................. H04N 1/40
[52] U.S. Cl. ........................... 358/443; 382/252; 382/266
[58] Field of Search ..................................... 358/429, 448, 358/455, 456, 457, 458, 463, 465, 466, 471, 447; 382/232, 237, 443, 252, 266

[56] References Cited

U.S. PATENT DOCUMENTS

| | | | |
|---|---|---|---|
| 4,876,610 | 10/1989 | Ohsawa et al. | 358/443 |
| 5,014,333 | 5/1991 | Miller et al. | 358/466 |
| 5,051,844 | 9/1991 | Sullivan | 358/443 |
| 5,070,413 | 12/1991 | Sullivan et al. | 358/443 |
| 5,317,653 | 5/1994 | Eschbach et al. | 358/456 |
| 5,339,171 | 8/1994 | Fujisawa et al. | 358/458 |

FOREIGN PATENT DOCUMENTS

| | | | |
|---|---|---|---|
| 0476220 | 3/1992 | European Pat. Off. | H04N 1/46 |
| 1284173 | 11/1989 | Japan | H04N 1/40 |
| 5504035 | 6/1993 | Japan | H04N 1/40 |
| WO9112686 | 8/1991 | WIPO | H04N 1/40 |

*Primary Examiner*—Joseph Mancuso
*Assistant Examiner*—Jerome Grant, II
*Attorney, Agent, or Firm*—Sughrue, Mion, Zinn, Macpeak & Seas

[57] ABSTRACT

In an image processing system containing a binary-coding apparatus for transforming multigradation image data into bigradation image data formed of only two gradations (e.g. black and white), the binary-coding apparatus includes a binary-coding section for binary-coding a target pixel into the first gradation value or the second gradation value; an error diffusion section for diffusing a binary-coding error caused during the process of binary-coding the target pixel, to its adjoining pixels not yet binary-coded; and an error diffusion matrix select section for selecting one of at least two error diffusion matrices used by the error diffusion section. The selection between matrices is rendered in accordance with an original image gradation data value of the target pixel and a binary-coding result of the target pixel. When the binary-coding result of the target pixel is the first gradation value, the error diffusion matrix select section selects an error diffusion matrix of large size when an original image gradation data value differs greatly from the first gradation value and approximates the second gradation value, so that the binary-coding error is diffused to a broader area.

9 Claims, 6 Drawing Sheets

FIG. 4(a)

| BINARY-CODING RESULT | ORIGINAL IMAGE DATA | USED MATRIX |
|---|---|---|
| 0 | 0~255 | Mat_S |
| 255 | 0~ 32 | Mat_L |
| 255 | 33~255 | Mat_S |

FIG. 4(b)

| BINARY-CODING RESULT | ORIGINAL IMAGE DATA | USED MATRIX |
|---|---|---|
| 0 | 0~222 | Mat_S |
| 0 | 223~255 | Mat_L |
| 255 | 0~ 32 | Mat_L |
| 255 | 33~255 | Mat_S |

FIG. 4(c)

| BINARY-CODING RESULT | ORIGINAL IMAGE DATA | USED MATRIX |
|---|---|---|
| 0 | 0~237 | Mat_S |
| 0 | 238~255 | Mat_L |
| 255 | 0~ 32 | Mat_H |
| 255 | 33~255 | Mat_S |

FIG. 4(d)

| BINARY-CODING RESULT | ORIGINAL IMAGE DATA | USED MATRIX |
|---|---|---|
| 0 | 0~237 | Mat_S |
| 0 | 238~255 | Mat_L |
| 255 | 0~ 16 | Mat_H |
| 255 | 17~ 32 | Mat_L |
| 255 | 33~255 | Mat_S |

FIG. 4(e)

| BINARY-CODING RESULT | ORIGINAL IMAGE DATA | USED MATRIX |
|---|---|---|
| 0 | 0~127 | Mat_S |
| 0 | 128~237 | Mat_M |
| 0 | 238~255 | Mat_L |
| 255 | 0~ 16 | Mat_H |
| 255 | 17~ 32 | Mat_L |
| 255 | 33~128 | Mat_M |
| 255 | 129~255 | Mat_S |

*: TARGET PIXEL

P(i, j) : TARGET PIXEL

IMAGE PROCESSING SYSTEM CAPABLE OF SELECTING FROM AMONG A PLURALITY OF ERROR DIFFUSION MATRICES

BACKGROUND OF THE INVENTION

The present invention relates to an image processing system having the function of transforming multigradation image data into bigradation image data (binary-coding function) for the purpose of reducing the quantity of data, outputting the image data to a CRT display or a printer, and the like. More particularly, the present invention relates to an image binary-coding apparatus for binary-coding image data by using an error diffusion method, and an image input apparatus, an image processing apparatus and an image output apparatus, each of these apparatuses including the image binary-coding apparatus.

When multigradation image data is output to a printer or a display apparatus that does not have the function of pixel basis gradation control or when the quantity of data is to be reduced for storage and data transmission, a binary-coding process for reducing the number of gradations of each pixel to two gradations is widely used. There are a variety of binary-coding methods. Of these methods, the error diffusion method is popular because it can produce the image of the best quality.

The error diffusion method is based on "error diffusion" in which a quantitizing error caused during the process of binary-coding a pixel is distributed to its adjoining pixels that are not yet binary-coded, in accordance with their weights, without discarding the quantitizing error. Accordingly, a mean value of the binary-coding errors in a local image area is extremely small. The quality of the image produced by the error diffusion method is much higher than that produced by the systematic dither method, in which the binary-coding error is discarded. The error diffusion method produces an image of high resolution and is capable of realizing a continuous gradation reproduction. For the conventional method using the error diffusion method, reference is made to Published Unexamined Japanese Patent Application No. Hei. 1-284173, entitled "IMAGE PROCESSING METHOD AND APPARATUS FOR EXECUTING THE SAME".

In the distribution of the errors by the error diffusion method, a means describing "how to specify the adjoining pixels to which the errors are distributed and how to weight these specified adjoining pixels" is referred to as an "error diffusion matrix". The number of adjoining pixels to which the error is diffused is referred to as "matrix size". Some examples of the error diffusion matrices of the type in which the adjoining pixels are under a target pixel are shown in FIGS. 5(a) to 5(e). The matrix sizes of these error diffusion matrices are 2, 4, 7, 10, and 13, respectively. When the error diffusion matrix shown in FIG. 5(b) is used, a binary-coding error caused in the target pixel is quartered with an equal weight. These divided errors are respectively added to the gradation image data of its adjoining four pixels not yet binary-coded, a right pixel, a left under pixel, an under pixel, and a right under pixel.

In the error diffusion method, it is necessary to distribute the binary-coding error caused in the target pixel to its adjoining pixels not yet binary-coded by using any of the error diffusion matrices as shown in FIGS. 5(a) to 5(e). Therefore, the number of processing steps is remarkably increased in comparison to the systematic dither method. The time for the processing is also increased. The processing time and the number of processing steps are both increased as the size of the error diffusion matrix becomes large. Where a high processing speed is required, it is preferable to use an error diffusion matrix of small size.

Let us consider the error diffusion method from the standpoint of image quality. In a case where an error diffusion matrix of small size is used, for reducing the processing time, an error diffusion area is small. In this case, if a density of distributed dots that are formed by the binary-coding process is low, "a distribution of dots is not uniform, dots are nonuniformly strung out, and the quality of the resultant image is poor" For example, consider original image data of such a low density that after it is binary-coded, the ratio of the black dots to all of the dots is 10% or less. If such original image data is binary-coded by using the error diffusion matrix of small size (i.e., the error diffusion area is small), as shown in FIG. 5(a) or 5(b), the result of binary-coding the image data is as shown in FIG. 8(a). As shown, black dots are strung out and are nonuniformly spaced. The resultant image quality is poor. By using an error diffusion matrix of large size (which provides a large error diffusion area), e.g., as shown in FIG. 5(e), the image quality is improved, as shown in FIG. 8(b). However, when the error diffusion matrix of large size is used, the amount of processing and the processing time are increased as described before. Thus, the conventional error diffusion method cannot satisfy both the requirements for the image quality and the processing amount/time concurrently.

SUMMARY OF THE INVENTION

The present invention has been made in view of the above circumstances and has an object to provide an image processing system which can binary-code multigradation images, while securing a good dot dispersion even if a dot density is low and securing a high image quality without increasing the processing quantity and time.

According to the present invention, an image processing system comprises a binary-coding apparatus for transforming multigradation image data into bigradation image data consisting of only two gradations of a first gradation value and a second gradation value, which comprises: binary-coding means for binary-coding a target pixel into the first gradation value or the second gradation value; error diffusion means for diffusing a binary-coding error caused during the process of binary-coding the target pixel, to its adjoining pixels not yet binary-coded; and error diffusion matrix select means for selecting one of error diffusion matrices used by the error diffusion means, in accordance with the original image gradation data value of the target pixel and the binary-coded result of the target pixel, wherein, when the binary-coded result of the target pixel is the first gradation value, the error diffusion matrix select means selects an error diffusion matrix of large size when the original image gradation data value is greatly different from the first gradation value and approximates to the second gradation value whereby the binary-coding error is diffused to a broader area.

In the description to follow, a pixel to be binary-coded is referred to as a target pixel. The process for binary-coding the target pixel will be described hereinafter.

The binary-coding means compares the correction data value of the target pixel with the threshold value, binary-codes the target pixel to the first gradation value or the second gradation value on the basis of the comparison result, and produces the binary-coded result. The correction data is formed by adding binary-coding errors delivered from the binary-coded pixels adjoining to the target pixel to the original image gradation data of the target pixel. More specifically, the binary-coding is carried out in the following way.

It is assumed that first gradation value>second gradation value. On this assumption, if correction data>threshold, binary-coding result=first gradation, and if correction data<threshold, binary-coding result=second gradation.

If correction data=threshold, the binary-coding result may be the first gradation value or the second gradation value.

The error diffusion means calculates a binary-coding error, viz., the difference between the correction data value and the binary-coding result. That is, Binary-coding error=correction data—binary-coding result.

The error diffusion means distributes the calculated error to the adjoining not-yet-binary-coded pixels in accordance with the weights that are defined by the error diffusion matrix. At this time, the error diffusion matrix select means selects a error diffusion matrix of larger size when either of the following two conditions a) and b) holds, while referring to the binary-coding result of the target pixel and the original image gradation data value, thereby realizing the error diffusion to a broader area.

a) Binary-coding result=first gradation value, and original image gradation data value≈second gradation value.

b) Binary-coding result=second gradation, and original image gradation data value≈first gradation value.

A first point of the present invention is that a good dot dispersion property and the binary-coding result of high image quality are secured by merely using the error diffusion matrix of large size only when the condition a) or b) holds. When the error diffusion matrix of large size is selected under the condition a), the dots binary-coded to the first gradation are uniformly distributed. When the error diffusion matrix of large size is selected under the condition b), the dots binary-coded to the second gradation are uniformly distributed.

A second point of the present invention is that the conditions a) and b) take place at an extremely small probability. For the condition a), for example, when the original image gradation data is approximate to the second gradation value, the binary-coded result will also be the second gradation value at a high probability, while it will be the first gradation value at a low probability. Therefore, use of the error diffusion matrix of large size takes place at an extremely small probability. In most cases, the error diffusion matrix of small size is used, so that the processing quantity and time are minimized.

BRIEF DESCRIPTION OF THE DRAWINGS

FIGS. 4(a) to 4(e) are tables showing examples of the error diffusion matrix select conditions according to the present invention.

DETAILED DESCRIPTION OF THE PREFERRED EMBODIMENTS

The preferred embodiments of an image processing system according to the present invention will be described in detail with reference to the accompanying drawings.

Figure 1:
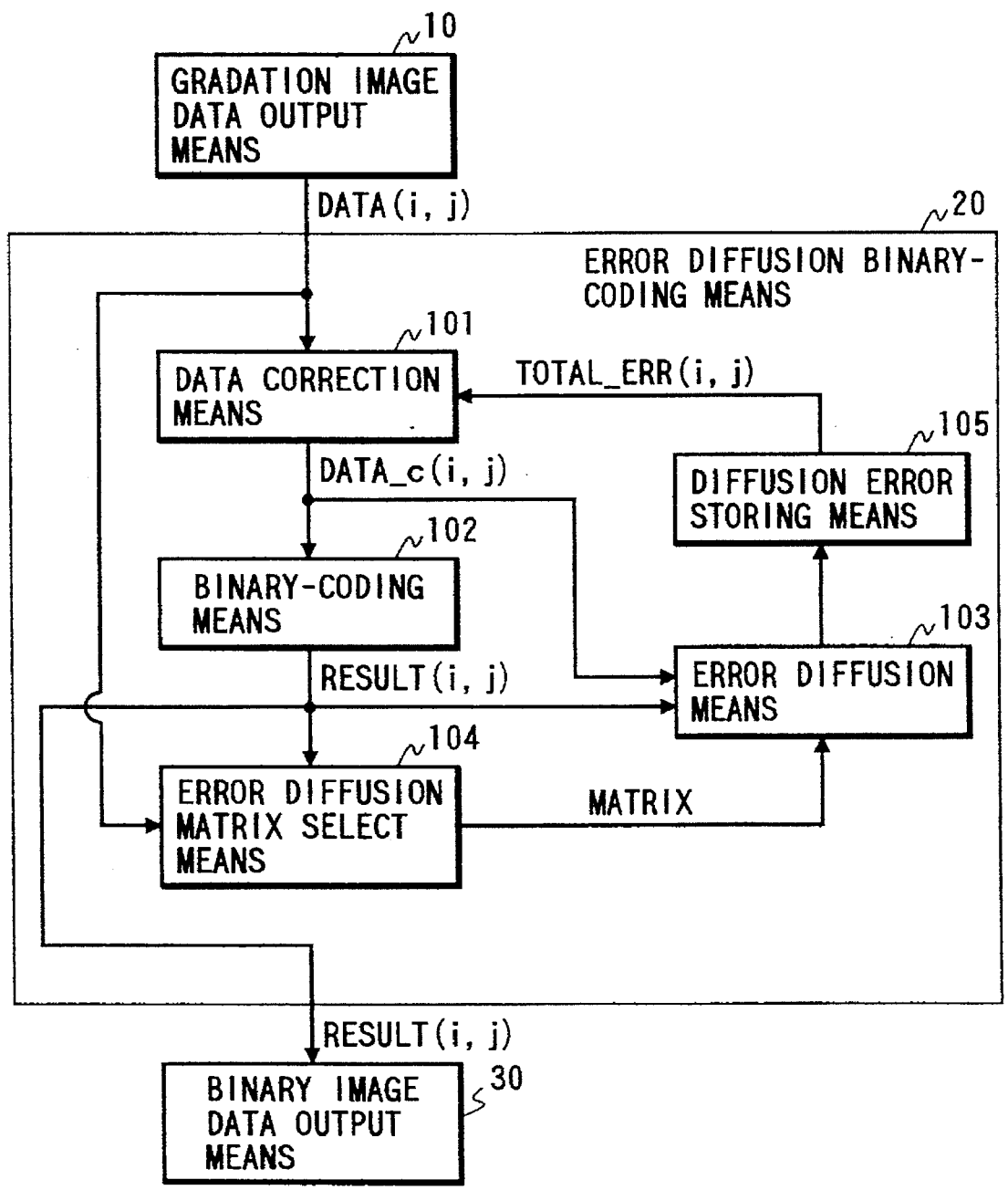
FIG. 1 is a block diagram showing a first embodiment of the present invention.

FIG. 1 is a block diagram showing a first embodiment of the present invention. In the figure, an error diffusion binary-coding means 20 receives and binary-codes original image gradation data data (i, j) from a gradation image data output means 10, and outputs the binary-coding result result (i, j) to a binary image data output means 30. In the above denotation, i and j indicate integers. The data denoted as data (i, j) indicates the data of the pixel located at the i-th position as counted downward from a start pixel and the j-th position as counted to the right from the same. In FIG. 1, the error diffusion binary-coding means 20 is a key portion of the image processing apparatus of the present invention. The embodiment of the present invention to be described hereinafter is specified as follows.

a) Original image gradation data used in the embodiment is data of 256 gradations in the range from 0 (white) to 255 (black). The pixel density becomes higher as the gradation value becomes larger.

b) The original image gradation data is binary-coded to 0 or 255 by the error diffusion method.

c) For the binary-coding scan sequence, the main scan direction means the direction of the binary-coding scan in which the binary-coding proceeds from left to right. The sub scan direction means the direction of the binary-coding scan in which the binary-coding proceeds from top to bottom.

More specifically, the process of binary-coding the data of all the pixels of one frame starts from a start pixel positioned at the upper left corner on the screen and progresses in the main scan direction, one element at a time, in sequential order. When the binary-coding process reaches the pixel positioned at the right end, the binary-coding of all the pixels of one line is completed. Then, the process of binary-coding shifts to the lower line by one pixel in the sub scan direction and the binary-coding is conducted from the left end pixel to the right end pixel to complete the binary-coding of all the pixels of the second line. In this way, the binary-coding is done for all the pixels of one frame.

Figure 7:
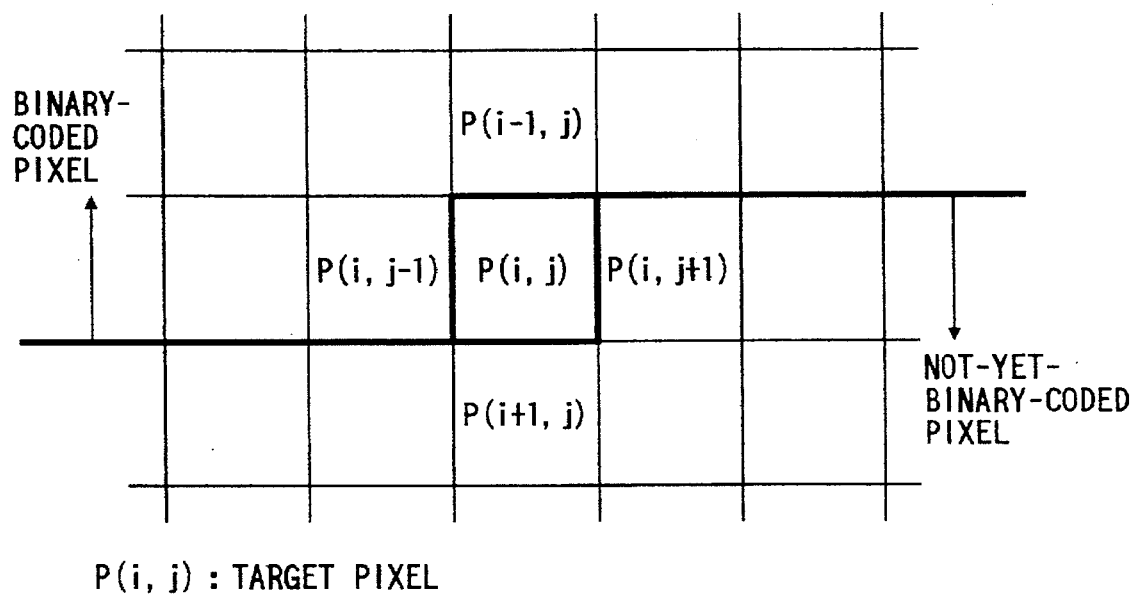
FIG. 7 is a diagram showing a target pixel and its adjoining pixels, viz., binary-coded pixels and not-yet-binary-coded pixels.

The pixel, which is located at the i-th position as counted downward from the start pixel and the j-th position as counted to the left from the same, is called a pixel of the row i and the column j, and denoted as P[i, j]. Here, the start pixel is expressed as P[0, 0]. It is assumed that the pixel P[i, j] is a target pixel to be binary-coded. For the normal pixels except the pixels located at the extreme ends of the image, as shown in FIG. 7, the pixel (on the line above) just above the target pixel and the pixel on the left side of the target pixel on the same line are the binary-coded-pixels. The pixel (on the line below) under the target pixel and the pixel on the right side of the target pixel on the same line are the not-yet-binary-coded pixels.

In this embodiment, the "first gradation value" is 255, and the "second gradation value" is 0. Further, in this embodiment, only when the binary-coding result is the first gradation value, the error diffusion matrix is switched to another error diffusion matrix.

Figure 9:
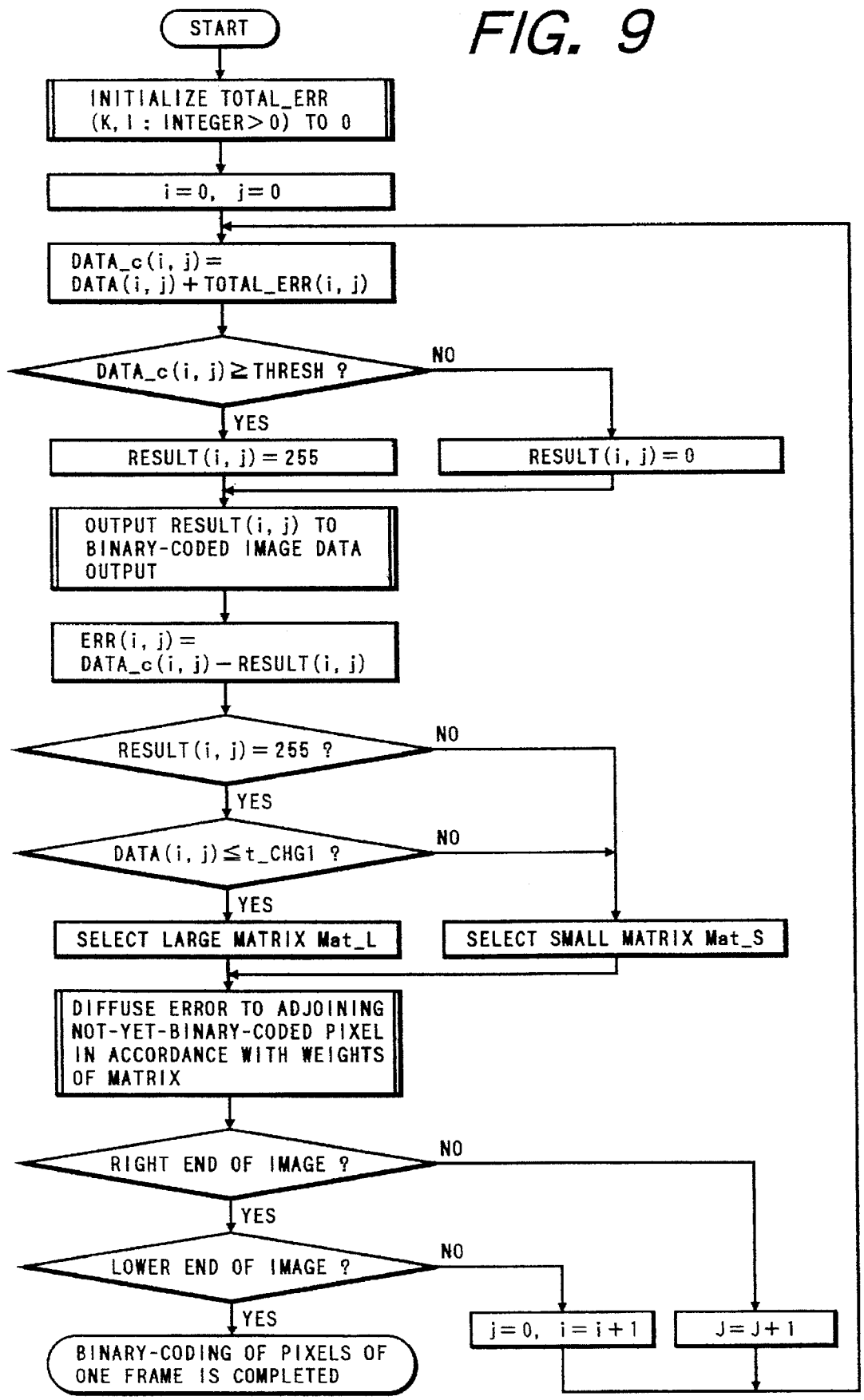
FIG. 9 is a flowchart showing a flow of the binary-coding process by the first embodiment.

Now, the procedure of binary-coding the original image gradation data data (i, j) of the pixel P[i, j] that is carried out by the error diffusion binary-coding means 20 (FIG. 1) will be described with reference to FIG. 9 showing a flowchart. The binary-coding procedure consists of five steps 1 to 5.

[Step 1]

The data correction means 101 reads a diffusion error accumulated value total_err (i, j) out of the diffusion error storing means 105, and adds it to the original image gradation data data (i, j) that is received from the gradation image data output means 10. As a result, the data correction means 101 produces correction data data_c (i, j).

$$\text{data\_c } (i, j) = \text{data } (i, j) + \text{total\_err } (i, j)$$

The diffusion error accumulated value total_err (i, j) stored in the diffusion error storing means 105 indicates the total sum of the errors that are diffused to the target pixel P[i, j] from its binary-coded pixels in a step 5, described later, during the process of binary-coding those pixels (i.e.) those pixels that are already binary-coded and denoted as P[i-1, j] and P[i, j-1]) adjoining to the target pixel P[i,j].

[Step 2]

The binary-coding means 102 compares the correction data data_c (i, j) of the target pixel that is received from the data correction means 101 with the threshold value thresh, and produces the binary-coding result result (i, j). Here, If data_c (i, j)≧thresh, result (i, j)=255.
If data_c (i, j)<thresh, result (i, j)=0.
In this embodiment, thresh=128.

The binary-coding result result (i, j), output from the error diffusion binary-coding means 20, is also applied to the binary image data output means 30. In this case, it is of course also possible to output result (i, j) in the form binary data of 0 or 1. For example, when the result (i, j)=255, it may be replaced by "1" if desired.

[Step 3]

The error diffusion means 103 first calculates binary-coding error err(i, j) using the following equation:

$$\text{err}(i, j) = \text{data\_c } (i, j) - \text{result } (i, j)$$

where data_c (i, j): correction data result (i, j): binary-coding result

[Step 4]

The error diffusion matrix select means 104 sets a first gradation select point t_chg1 (in this embodiment, e.g., t_chg1=32), and selects an error diffusion matrix: matrix in the following manner.

a) When result (i, j)=0, the small matrix Mat_S is selected.
b) When result (i, j)=255,
   if data (i, j)≦t_chg1, the large matrix Mat_L is selected, and
   if data (i, j)>t_chg1, the small matrix Mat_S is selected.

[Step 5]

The error diffusion means 103 distributes the binary-coding error err(i, j) to the adjoining pixels, such as the pixels P[i, j+1], P[i+1, j], and P[i+1, j+1] in accordance with the weights of the error diffusion matrix. More specifically, the diffusion error, derived from the target pixel P[i, j], is added to the diffusion error accumulated values total_err (i, j+1), total_err (i+1, j), and the like, each for one pixel, that are stored in the diffusion error storing means 105. Before starting the scan for binary-coding the pixels of the present image, it is necessary to set the initial values of the previous diffusion error accumulated values to 0.

Figures 5A, 5B, 5C, 5D, 5E, 6:
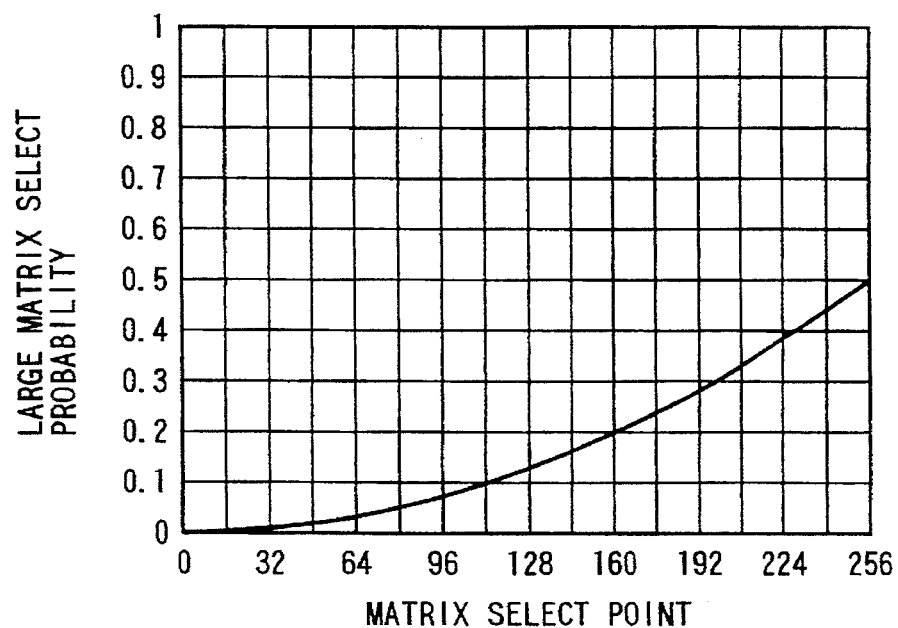
FIGS. 5(a) to 5(e) are diagrams showing examples of the error diffusion matrices used in the invention.
FIG. 6 is a graph showing a variation of a large matrix select probability with respect to a matrix select point.

In this embodiment, the small matrix Mat_S is the error diffusion matrix shown in FIG. 5(b), and the large matrix Mat_L is the error diffusion matrix shown in FIG. 5(d). When the small matrix Mat_S is selected for the error diffusion matrix, the total sum of the weights is 4. Then, the result of multiplying the err(i, j) by the weight and dividing the resultant product by 4 is the quantity of diffusion error to be diffused to the adjoining pixels. An actual error diffusing process is carried out as given below.

[TABLE 1]

| |
|---|
| total_err(i, j + 1) = total_err (i, j + 1) + err (i, j) * (¼) |
| total_err(i + 1, j − 1) = total_err (i + 1, j − 1) + err (i, j) * (¼) |
| total_err(i + 1, j) = total_err (i + 1, j − 1) + err (i, j) * (¼) |
| total_err(i + 1, j + 1) = total_err (i + 1, j + 1) + err (i, j) * (¼) |

When the large matrix Mat_L is selected for the error diffusion matrix, the total sum of the weights of the matrix of FIG. 5(d) is 16. The error diffusing process is carried out as given below.

[TABLE 2]

| |
|---|
| total_err(i, j + 1) = total_err (i, j + 1) + err (i, j) * (³⁄₁₆) |
| total_err(i, j + 2) = total_err (i, j + 2) + err (i, j) * (¹⁄₁₆) |
| total_err(i + 1, j − 2) = total_err (i + 1, j − 2) + err (i, j) * (¹⁄₁₆) |
| total_err(i + 1, j − 1) = total_err (i + 1, j − 1) + err (i, j) * (²⁄₁₆) |
| total_err(i + 1, j) = total_err (i + 1, j) + err (i, j) * (³⁄₁₆) |
| total_err(i + 1, j + 1) = total_err (i + 1, j + 1) + err (i, j) * (²⁄₁₆) |
| total_err(i + 1, j + 2) = total_err (i + 1, j + 2) + err (i, j) * (¹⁄₁₆) |
| total_err(i + 2, j − 1) = total_err (i + 2, j − 1) + err (i, j) * (¹⁄₁₆) |
| total_err(i + 2, j) = total_err (i + 2, j) + err (i, j) * (¹⁄₁₆) |
| total_err(i + 2, j + 1) = total_err (i + 2, j + 1) + err (i, j) * (¹⁄₁₆) |

The process of binary-coding the target pixel P[i, j] and diffusing the resultant errors to its adjoining pixels is completed when the procedural steps [Step 1] to [Step 5] have been carried out. Then, the value j is incremented by one, and the binary-coding process starts again, with a new target pixel as the pixel located on the right side of the previous target pixel. This binary-coding process is repeated for all the pixels of one line. Thereafter, the value j is set to zero, and the value i is incremented by one so that the left end pixel on the next line becomes a new target pixel. The binary-coding process is repeated again for all the pixels on the next line. In this way, the data of one frame of the image is binary-coded.

In the binary-coding procedure executed by the error diffusion binary-coding means 20, the steps [Step 4] and [Step 5] are unique, while the remaining procedure are substantially equal to the corresponding one of the conventional error diffusion method. In those steps, one of the two types of error diffusion matrices is selected under specific conditions and the error diffusion is performed using the selected matrix. The original image data and the binary-coding results define the matrices as shown in FIG. 4(a).

Figure 8A:
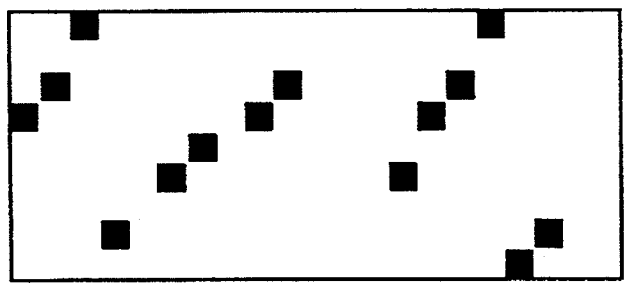
FIGS. 8(a) and 8(b) are diagrams showing states of diffused black dots in an image area of low density, respectively.
Figure 8B:
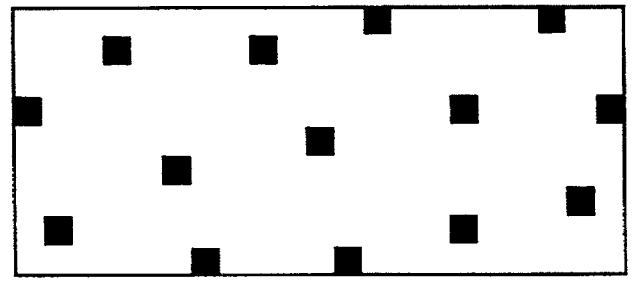

The reason why this embodiment provides a good dot diffusion will be described. The inventor of the present Patent Application considered the "mechanism uniformly distributing black dots" in the error diffusion method and the reason why the mechanism is destroyed and the black dots are strung out as shown in FIG. 8(a)". The "mechanism which uniformly distributes black dots" in the error diffusion method may be considered as follows.

1) In the error diffusion method, when a pixel is binary-coded into 255 (black dot), the binary-coding error err(i, j) produced in the step [Step 3] is usually negative, and the negative error is diffused to the adjoining not-yet-binary-coded pixels in the step [Step 5].

2) The corrected data of the adjoining pixels which have received the negative error are smaller than the data of those pixels before corrected. This fact makes it difficult to binary-code the data of those pixels into 255 (black dot).

3) As a result, the black dots are uniformly diffused in a separate fashion while being not strung out.

To uniformly diffuse the black dots, the distance between the adjacent black dots must be increased as the density becomes lower. If the gradation is 16, for example, the ratio of black dots generated is $16/255 \approx 1/16$. In other words, one black dot pixel is generated every sixteen pixels. The distance between the black dots is about four pixels in the two-dimensional plane. When the error diffusion matrix as shown in FIG. 5(b) is used, an error caused when a pixel is binary-coded is not diffused directly to the pixels spaced from a target pixel the distance of two pixels or more. For this reason, the black dots are strung out while being spaced from each other the distance of about two pixels. There is such an indirect diffusion effect that "from a pixel to which the error has been diffused, the error is further diffused to its adjoining pixels.". Because of this indirect diffusion effect, there is the possibility that the error is transferred to the pixels outside the matrix. When the matrix is small, this effect is also weak, however. In the case of the error diffusion matrix of FIG. 5(b), no error is transferred from the target pixel P[i, j] to the pixel P[i+1, j−2] even if the indirect diffusion effect is present.

As a consequence, it is thought that "the reason why the black dots are strung out as shown in FIG. 8(a) in the image area of low density" is that "in the image area of low density, although the distance between the adjacent black dots must be increased, the error cannot be diffused up to the range of the necessary dot-to-dot distance by the error diffusion matrix of small size."

On the basis of the above considerations, it is concluded that from the standpoint of "improvement of the diffusion of black dots", it is not always necessary to use the error diffusion matrix of large size, and that 1) only the binary-coding error caused when the pixel data is binary-coded into the black dot is diffused to a broader area, while the binary-coding error when it is binary-coded into the white dot is diffused to a not so broad range, and that 2) in accordance with the dot-to-dot distance necessary for securing a uniform diffusion of the dots, the size of the matrix selected should be larger as the density of the image area becomes lower. In the image area of the middle and high density, the error diffusion matrix of small size may be used.

The image processing system of the present embodiment is designed on the basis of the above conclusions and succeeds in remarkably improving the dot diffusion in the image area of low density. In the image processing system according to the present embodiment, to select the error diffusion matrix, the matrix select point t_chg1 is set to 32. The large matrix Mat_L is selected only when the original image gradation is set to a value of less than 32 and the binary-coding result is 255 (black dot). In other conditions, the small matrix Mat_S is selected.

In the present embodiment, as described above, a probability that the large matrix Mat_L is selected is very small, and in most cases the small matrix Mat_S is selected. The reason for this will be described. Usually, a probability that the binary-coding result is 0 and a probability that it is 255 depend on the original image gradation value data (i, j), and are given below.

Probability that result (i, j)=0: (255−data (i,j))/255

Probability that result (i, j)=255: data (i, j)/255

Since the large matrix Mat_L is selected under the conditions that result (i, j)=255 and data (i, j)≦32, a probability that the large matrix Mat_L is selected is data (i, j)/255 when data (i, j) is within the range of 0 to 32, and 0 when data (i, j) is within the range of 33 to 255.

Accordingly, when data (i, j)=32, the large matrix Mat_L is selected at the highest probability. This probability is 32/255 (≈0.13). Thus, even in the worst case where the original image data data (i, j) are all 32, the probability of selecting the large matrix is 13% or less. In a case where the original image data values are uniformly distributed in the range from 0 to 255, a probability that the large matrix is selected is 1% or less. The number of processing steps and the processing time are nearly equal to those in the case where the small matrix alone is used. A variation of the probability of selecting the large matrix with respect to various values of the first gradation select point t_chg1 is shown in a graph of FIG. 6. The formula for calculating the probability is given by $$\sum_{k=0}^{t\_chg1} (k/255)/255$$

As the first gradation select point (t_chg1) approaches the second gradation value (0 in this embodiment), the probability of selecting the large matrix becomes small. This is advantageous in capitalizing on the improvement of the processing speed. As seen from the graph of FIG. 6, in a region where the first gradation select point t_chg1 is 127.5 (a mid value between the first and second gradations) or less, the probability is roughly ten and % or less, and is thus satisfactorily small. In a region where the first gradation select point t_chg1 exceeds 127.5, the rate of the large matrix select probability gradually increases. Therefore, in embodiments where only one first gradation select point is used, as in this embodiment, it is preferable to set t_chg1 to 128 or less.

As seen from the foregoing description, the image processing system of the first embodiment outputs the binary-coding result of high image quality and produces a good diffusion of black dots, which are comparable with those achieved by the image processor using only the large matrix. The processing time for the binary-coding is nearly equal to that of the image processor using only the small matrix.

It should also be noted that the present embodiment makes no improvement in the dispersion property of white dots in an image area of high density in particular. In the printer system in which the output apparatus prints out dots by black ink on a white paper, black dots in an image area of low density spread to enlarge their areas and are likely to become noticeable. On the other hand, white dots in the image area of high density tend to decrease their areas as the result of the spread of its adjoining black dots. Accordingly, the white dots scarcely become noticeable. From this fact, it is seen that the image quality can be remarkably be improved by improving only the dispersion property of black dots, as in the present embodiment, without needing to do the same for white dots.

A second embodiment of the present invention will be described. A block diagram showing the arrangement of the second embodiment is the same as that of the first embodiment shown in FIG. 1. Hence, the block diagram of FIG. 1 will be referred to in the description of the second embodiment. The first embodiment is arranged so as to improve the dispersion property of black dots in the image area of low density only. The second embodiment is arranged so as to additionally improve the dispersion property of white dots in the image area of high density. To this end, a second gradation select point 2 t_chg2 is used in addition to the first gradation select point 1 t_chg1. The large matrix is used also when the binary-coding result is 0 (white dot) in the image area of high density where the original image data data (i, j)≧t_chg2. In the second embodiment, t_chg2=223. The mechanism to improve the white dots dispersion property in the high density area is exactly the same as that to improve the black dots dispersion property if the logic for the black dots dispersion property is reversed.

The second embodiment is different from the first embodiment only n the step [Step 4]. The step [Step 4] in the first embodiment is replaced by a step [Step 4'], in the second embodiment.

[Step 4']:

The error diffusion matrix select means 104 selects the error diffusion matrix matrix in the following manner by using the first gradation select point 1 t_chg1 (set to 32 in this embodiment) and the second gradation select point 2 t_chg2 (set to 223 in this embodiment).

| | |
|---|---|
| a) | When result (i, j) = 255, if data (i, j) ≦ t_chg1, the large matrix Mat_L is selected, and if data (i, j) > t_chg1, the small matrix Mat_S is selected. |
| b) | When result (i, j) = 0, if data (i, j) ≧ t_chg2, the large matrix Mat_L is selected, and if data (i, j) < t_chg2, the small matrix Mat_S is selected. |

In this embodiment, the original image data and the binary-coding results define the matrices as shown in FIG. 4(b). The reason why the number of the processing steps and the processing time are slightly increased in this embodiment is as described in the first embodiment. Thus, the second embodiment improves the black dot dispersion property in the low density area and the white dot dispersion property in the high density area. Accordingly, the second embodiment further improves the image quality in comparison to the first embodiment.

A third embodiment of the present invention will next be described. In the third embodiment, the large matrix for the improvement of the black dots dispersion property is different in construction from that for the improvement of the white dots dispersion property, while in the second embodiment, the former is the same as the latter. As already stated, in the printer system, the black dots rather than white dots are noticed especially. In the present embodiment, the error diffusion matrix shown in FIG. 5(e), larger than the large matrix Mat_L, is used for the large matrix for black dots. This matrix is referred to as a huge matrix Mat_H. With the use of the huge matrix Mat_H, the dispersion property of black dots in the low density area is further improved. The first gradation select point t_chg1 for black dots is 32, equal to that in the second embodiment, but the second gradation select point t_chg2 for white dots is greatly increased from 223 to 239. With this, the frequency of using the large matrix is reduced in order to increase the processing speed. In the present embodiment, the step [Step 4'] in the second embodiment is replaced by the following step [Step 4"]. [Step 4"] :

The error diffusion matrix select means 104 sets the first gradation select point t_chg1 to 32, and the second gradation select point t_chg2 to 239, and selects an error diffusion matrix matrix in the following manner.

| | |
|---|---|
| a) | When result (i, j) = 255, if data (i, J) ≦ t_chg1, the huge matrix Mat_H is selected, and if data (i, j) > t_chg1, the small matrix Mat_S is selected. |
| b) | When result (i, j) = 0, if data (i, j) ≧ t_chg2, the large matrix Mat_L is selected, and if data (i, j) < t_chg2, the small matrix Mat_S is selected. |

In this embodiment, the original image data and the binary-coding results define the matrices as shown in FIG. 4(c). When the huge matrix is selected, the error diffusion process in the next step [Step 5] is different from that in the second embodiment, as a matter of course. However, the basic idea thereof is the same as that in the second embodiment, and hence detailed description thereof is omitted here.

A fourth embodiment of the present invention will now be described. In the fourth embodiment, the number of matrix sizes is increased to three sizes, a small size, a large size, and a huge size, in accordance with the gradation of the original image, in order to improve the black dot dispersion. Further, the processing time and the image quality are optimized. The construction of each of the error diffusion matrices of small, large, and huge sizes is the same as that of the third embodiment. In the fourth embodiment, the selection of the matrix in the step [Step 4] is made as shown in FIG. 4(d).

A fifth embodiment of the present invention will be described. In this embodiment, a medium matrix Mat_M is additionally used as one of the error diffusion matrices. Thus, a more fine selection of the matrix is conducted. The error diffusion matrix of FIG. 5(c) is used for the medium matrix Mat_M. The matrix selection in the step [Step 4] is made as shown in FIG. 4(e) in accordance with the data value of the original image and the binary-coding result.

In the above-mentioned embodiments, the error diffusion matrices of FIGS. 5(b), 5(c), 5(d), and 5(e) are assigned to the small, medium, large, and huge error diffusion matrices, respectively. However, any error diffusion matrices may be used if the matrix size order is suitable.

The above-mentioned embodiments are arranged while placing an emphasis on the improvement of the dispersion property of black dots rather than white dots. When the binary-coding result is the black dot, the error diffusion matrix is finely switched. However, when the binary image data output apparatus is a CRT display apparatus, white dots are more noticeable than black dots. In this case, the black and white dots may be treated equally. Alternatively, the image processing system may be designed placing an emphasis on the white dots. In this case, when the binary-coding result is the white dot, the error diffusion matrix is finely switched.

In the above-mentioned embodiments, the gradation data corresponds to such a density that 0 of the gradation is assigned to the white dot, and 255, to the black dot. However, even for the gradation data corresponding to such brightness that 0 is assigned to the black dot, and 255, to the white dot, the basic idea is substantially equal to that of the former embodiments except that the logic on black and white is reversed.

The image processing systems of the above-mentioned embodiments handle monochromatic data. It is evident that the technical idea of the present invention is applicable to color data consisting of different color components. In this case, the invention is applied to each color component. For full color data consisting of three color components, R (red), G (green), and B (blue) colors, the image processing apparatus of the present invention is applied to each of these color components. The matrix selecting method may be different for each color component. For example, the matrix can be switched at several levels for the color components of R and G, as shown in FIG. 4(d). For the color component of B, which is less noticeable than the color components of R and G, a matrix select pattern as shown in FIG. 4(a) can be used.

In the above-mentioned embodiments, the threshold value thresh used in the step [Step 2] is a fixed value. Alternatively, the threshold value thresh may be varied depending on the pixel by adding systematic dither noise, which varies at fixed periods depending on the pixel position, or a proper quantity of random noise to the threshold value thresh.

In the binary-coding scan for binary-coding the multigradation image data of one frame, according to alternative embodiments, the start pixel may be set at other positions besides the left upper corner of the screen. The scanning direction may be changed every line such that the pixels on the odd numbered line are scanned from the left end to the right end, and the pixels on the even-numbered line are scanned in the reverse direction, viz., from the right end to the left end. In this case, the error diffusion matrix must be reversed in use every line.

Any type of error diffusion method may be used for the present invention, so long as it encompasses processing analogous to that of step [Step 4].

The error diffusion binary-coding means 20 may be realized by software or by hardware designed exclusively for the error diffusion binary-coding process.

Figure 2A:
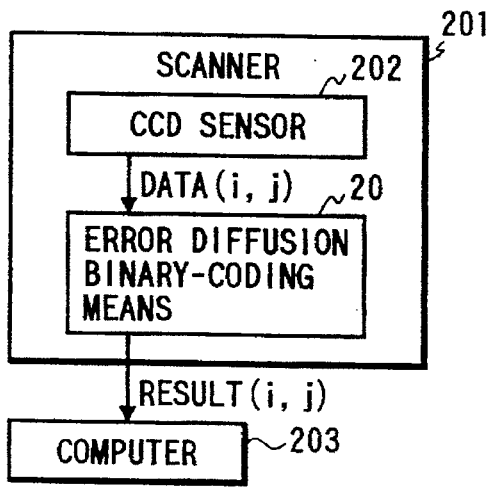
FIGS. 2(a) and 2(b) are block diagrams showing an application of the present invention in which the present invention is applied to a system including a scanner, respectively.
Figure 2B:
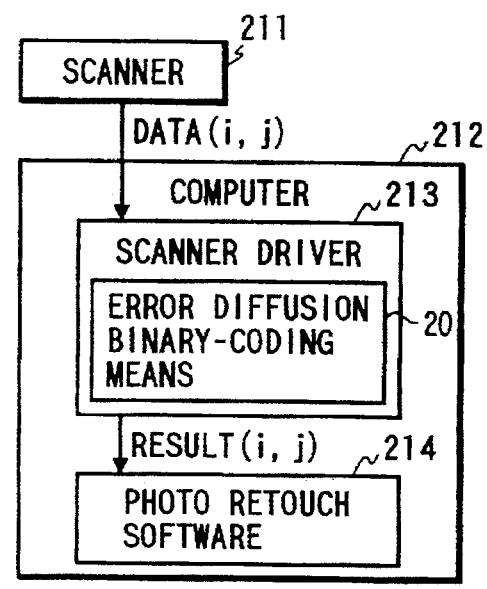
Figure 3A:
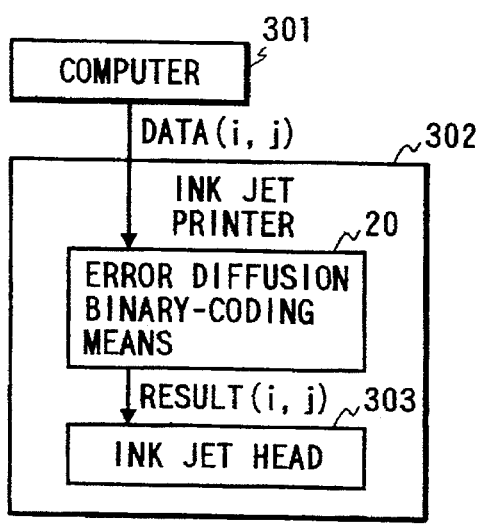
FIGS. 3(a) and 3(b) are block diagrams showing another application of the present invention in which the present invention is applied to a system including a printer, respectively.
Figure 3B:
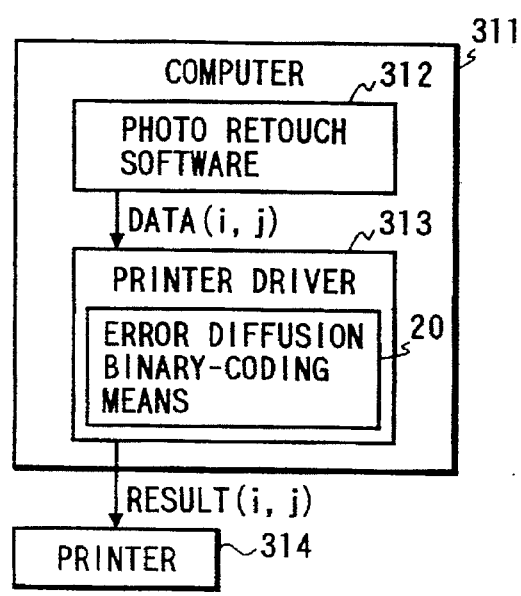

FIGS. 2 and 3 show specific illustrations of portions of the image processing system other than the error diffusion binary-coding means 20 shown in FIG. 1. FIG. 2(a) shows an image input apparatus including the error diffusion binary-coding means 20. FIG. 3(a) shows an image output apparatus including the error diffusion binary-coding means 20. FIG. 2(b) and 3(b) show computer apparatus each including the error diffusion binary-coding means 20.

FIG. 2(a) is an application of the present invention in which the present invention is applied to an image input apparatus. The error diffusion binary-coding means 20 is contained in the scanner as an image input apparatus. In the arrangement of the image input apparatus, a CCD sensor 202 corresponds to the gradation image data output means 10 in FIG. 1, and a computer 203 corresponds to the binary image data output means 30 in FIG. 1. In the image input apparatus, the CCD sensor 202 within a scanner 201 reads a reflection density of each pixel in an original image, processes the read image data for the digital-to-analog conversion and the correction for sensor characteristics, and outputs the thus processed image data as gradation image data data (i, j) to the error diffusion binary-coding means 20. The error diffusion binary-coding means 20 binary-codes the gradation image data. The binary-coding result result (i, j) is transmitted, as the output of the scanner 201, to the host computer 203 by way of an interface, such as SCSI. The binary image data, received by the computer 203, is displayed by a CRT display apparatus, processed by an image processing software, such as photo retouch software, or stored into an external memory, such as a hard disc. The error diffusion binary-coding means 20 may be realized such that an error diffusion binary-coding program is stored in a ROM, and a CPU contained in the scanner reads it out of the ROM and executes it. Alternatively, it may be realized by high speed processing hardware used only for the error diffusion processing.

FIG. 2(b) shows another application of the present invention in which a scanner driver contained in a host computer includes the error diffusion binary-coding means 20. A scanner 211 corresponds to the gradation image data output means 10 in FIG. 1. A photo retouch software 214 corresponds to the binary image data output means 30 in FIG. 1. In the application, an image read command, for example, is executed in the photo retouch software 214 running in a computer 212, so that the scanner 211 reads an image in response to the command. The scanner 211 straightforwardly outputs the read gradation image data data (i, j) to the computer 212, without binary-coding the gradation image data. In the computer 212, a scanner driver 213 containing the error diffusion binary-coding means 20 binary-codes the received gradation data. The binary-coding result result (i, j) is transferred to the photo retouch software 214 running in the computer 212. Under control of the photo retouch software 214, the binary-coding result is displayed by the CRT display or further processed. Usually, a printer driver is a kind of program executed by the CPU of the host computer, and the error diffusion binary-coding means 20 is described in terms of software. The host computer may contain high speed processing hardware used exclusively for the error diffusion, and the printer driver may execute the binary-coding processing at high speed by using the hardware.

FIG. 3(a) shows still another application of the present invention in which the present invention is applied to an image output apparatus. The error diffusion binary-coding means 20 is contained in a printer as an image output apparatus. In this application, a computer 301 corresponds to the gradation image data output means 10 in FIG. 1, and an ink jet head 303 corresponds to the binary image data output means 30 in FIG. 1. The gradation image data data (i, j) output from the computer 301 is binary-coded by the error diffusion binary-coding means 20 in an ink jet printer 302. In accordance with the binary-coding result result (i, j), the ink jet head 303 projects ink droplets to a print sheet, thereby forming dots on the sheet.

FIG. 3(b) shows yet another application of the present invention in which a print driver in a host computer contains the error diffusion binary-coding means 20. In this application, a photo retouch software 312 corresponds to the gradation image data output means 10 in FIG. 1, and a printer 314 corresponds to the binary image data output means 30 in FIG. 1. A printer output command, for example, is executed in the photo retouch software 312 running in a computer 311, so that the photo retouch software 312 outputs the gradation image data data (i, j) for transmission to a printer driver 313. The printer driver 313 binary-codes the data data (i, j) by using the error diffusion binary-coding means 20 contained therein, and outputs the binary-coding result result (i, j) together with a printer control command to a printer 314. In turn, the printer 314 prints out a binary image on a print sheet.

As seen from the foregoing description, in the present invention, an error diffusion matrix select means selects an error diffusion matrix of proper matrix size in accordance with the original image data value of a pixel to be binary-coded and the binary-coding result. An error diffusion matrix of large size is selected only when it is required. Therefore, a binary-coding apparatus which exhibits a good dot dispersion property, which is high in processing speed, and which produces high image quality is realized. This good dot dispersion property produced by the binary-coding apparatus is comparable to that obtained by systems using only a large error diffusion matrix. Additionally the processing time for producing the good dispersion property is nearly equal to that obtained by using only a small error diffusion matrix.

What is claimed is:

1. An image processing system comprising a binary-coding processing apparatus for transforming multigradation image data into bigradation image data formed of only two gradations of a first gradation value and a second gradation value, wherein said binary-coding processing apparatus comprises:

binary-coding means for binary-coding a target pixel into the first gradation value or the second gradation value;

error diffusion means for diffusing a binary-coding error caused during a process of binary-coding said target pixel, to adjoining pixels of said target pixel that are not yet binary-coded;

a plurality of error diffusion matrices available for use by said error diffusion means when said binary-coding error is diffused to said adjoining pixels not yet binary-coded, said error diffusion matrices differing in respective sizes in which said diffusion is conducted;

error diffusion matrix select means for selecting one of said plurality of error diffusion matrices to be used by said error diffusion means, in accordance with an original image gradation data value of said target pixel and a binary-coding result of said target pixel;

wherein, when the binary-coding result of said target pixel is the first gradation value, said error diffusion matrix select means selects an error diffusion matrix of large size in which the binary-coding error is diffused to a relatively broad image area if an original image gradation data value for said target pixel differs greatly from the first gradation value and approximates the second gradation value.

2. The image processing system according to claim 1, wherein;

said error diffusion matrix select means sets at least one first gradation matrix select point to a value between the first gradation value and the second gradation value, and when the binary-coding result of said target pixel is the first gradation value and the original image gradation data value is between the first gradation matrix select point and the second gradation value, said error diffusion matrix select means selects the error diffusion matrix of large size, which is larger in size than an error diffusion matrix to be used when the original image gradation data value is between said first gradation value and said first gradation matrix select point.

3. The image processing system according to claim 2, wherein the first gradation matrix select point is set to a value between the second gradation value and a middle value of the first and second gradation values.

4. The image processing system according to claim 1, 2 or 3, wherein when the binary-coding result of said target pixel is the second gradation value, said error diffusion matrix select means selects an associated error diffusion matrix of large size in which the binary-coding error is diffused to a relatively broad image area if an original image gradation data value for said target pixel differs greatly from the second gradation value and approximates the first gradation value.

5. The image processing system according to claim 4, wherein:

said error diffusion matrix select means sets at least one second gradation matrix select point to a value between the first gradation value and the second gradation value, and when the binary-coding result of said target pixel is the second gradation value and the original image gradation data value is between the first gradation value and the second gradation matrix select point, said error diffusion matrix select means selects the associated error diffusion matrix of large size, which is larger in size than an error diffusion matrix to be used when the binary-coding result of said target pixel is the second gradation level and the original image gradation data value is between the second gradation matrix select point and the second gradation value.

6. The image processing system according to claim 5, wherein the second gradation matrix select point is set to a value between the first gradation value and a middle value of the first and second gradation values.

7. An image processor capable of binary-coding multigradation image data of an original image composed of a plurality of pixels including a target pixel, comprising:

a data corrector for correcting an original image data value for the target pixel in accordance with a total accumulated error value for the target pixel and outputting a corrected image data value for the target pixel;

a first comparator for comparing the corrected image data value for the target pixel to a first threshold value and outputting a first comparison result;

a second comparator for comparing the original image data value for the target pixel to a second threshold value and outputting a second comparison result;

a binary-coder that utilizes the first comparison result to binary-code the corrected image data value for the target pixel into a binary-coding result for the target pixel, the binary-coding result for the target pixel having either a first gradation value or a second gradation value;

a calculator that calculates an error value for the target pixel based on a comparison between the binary-coding result for the target pixel with the corrected image data value for the target pixel;

a selector that actuates one of a plurality of error diffusion matrices in accordance with the second comparison result and the binary coding result for the target pixel, the plurality of error diffusion matrices each being unique and each being defined by both a number of not-yet-binary-coded pixels and weighting coefficients for the number of not-yet-binary-coded pixels; and an error diffuser that diffuses the error value for the target pixel to not-yet-binary coded pixels in accordance with the actuated error diffusion matrix.

8. The image processor according to claim 7:

further comprising a third comparator for comparing the original image data value for the target pixel to a third threshold value, and outputting a third comparison result; and wherein said selector actuates one of the plurality of error diffusion matrices in accordance with the second comparison result, the third comparison result and the binary-coding result for the target pixel.

9. A method for binary-coding multi-gradation image data for an original image composed of a plurality of pixels including a target pixel, comprising:

calculating a corrected image data value for the target pixel by correcting an original image data value for the target pixel in accordance with a total accumulated error value for the target pixel;

comparing the corrected image data value for the target pixel to a first threshold value, thereby producing a first comparison result;

comparing the original image data value for the target pixel to a second threshold value, thereby producing a second comparison result;

binary-coding the corrected image data value for the target pixel into a binary-coding result for the target pixel, based on the first comparison result, the binary-coding result for the target pixel having either a first gradation value or a second gradation value;

calculating an error value for the target pixel by comparing the binary-coding result for the target pixel with the corrected image data value for the target pixel;

selecting one of a plurality of error diffusion matrices in accordance with the second comparison result and the binary coding result for the target pixel, the plurality of error diffusion matrices each being unique and each being defined by both a number of not-yet-binary-coded pixels and weighting coefficients for the number of not-yet-binary-coded pixels; and diffusing the error value for the target pixel to not-yet-binary coded pixels in accordance with the selected error diffusion matrix.

\* \* \* \* \*